(12) United States Patent
Fleming et al.

(10) Patent No.: US 9,615,011 B1
(45) Date of Patent: Apr. 4, 2017

(54) ELECTRONIC DEVICE WITH EFFICIENT THERMAL DISSIPATION

(71) Applicant: Amazon Technologies, Inc., Seattle, WA (US)

(72) Inventors: Ryan Michael Fleming, San Francisco, CA (US); Christopher Michael Buonomo, San Jose, CA (US); James Nelson Aldrich, Campbell, CA (US); Alexander Hu, Fremont, CA (US); Bradley David Urban, Cupertino, CA (US); Aviv Shoval, Palo Alto, CA (US); Nagesh Rao Janapala, Sunnyvale, CA (US); Christopher Lorenzo Dunn, Los Gatos, CA (US); Kok Yen Cheng, San Jose, CA (US); Bryan Dan Trinh, San Jose, CA (US); Christopher John Kraeutle, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/975,615

(22) Filed: Dec. 18, 2015

(51) Int. Cl.
*H04N 5/225* (2006.01)
*H04N 5/232* (2006.01)

(52) U.S. Cl.
CPC ......... *H04N 5/2257* (2013.01); *H04N 5/2252* (2013.01); *H04N 5/23238* (2013.01)

(58) Field of Classification Search
None
See application file for complete search history.

(56) References Cited

U.S. PATENT DOCUMENTS

| | | | | | |
|---|---|---|---|---|---|
| 3,919,597 | A | * | 11/1975 | Meacham | H01J 19/36 313/21 |
| 4,485,407 | A | * | 11/1984 | Bohm | H04N 5/2252 219/201 |
| 7,043,280 | B1 | * | 5/2006 | Shields | H01Q 1/246 343/700 MS |
| 7,773,121 | B1 | * | 8/2010 | Huntsberger | G08B 13/19626 348/143 |
| 2006/0171704 | A1 | * | 8/2006 | Bingle | B60R 11/04 396/419 |
| 2011/0123189 | A1 | * | 5/2011 | Saito | G03B 17/02 396/535 |

(Continued)

*Primary Examiner* — Timothy J Henn
(74) *Attorney, Agent, or Firm* — Lee & Hayes, PLLC (57) ABSTRACT

An electronic device includes an elongated tubular housing. One or more electronic components are coupled to a chassis disposed in a cavity of the tubular housing. A pair of elongated channels are positioned on opposite sides of the chassis and between the chassis and a sidewall of the tubular housing. The channels are tapered or wedge-shaped along their lengths. During assembly, one of the channels may be slid longitudinally along the other, causing the channels to expand laterally, due to their wedge shape, to secure the chassis in the tubular housing. The chassis and the pair of channels provide a thermally conductive path to dissipate heat. During use, heat generated by the electronic components is transmitted radially outward from the electronic components, through the chassis and the pair of channels, and through the tubular housing to the exterior of the portable electronic device.

19 Claims, 10 Drawing Sheets

(56) References Cited

U.S. PATENT DOCUMENTS

| | | | |
|---|---|---|---|
| 2011/0286735 A1* | 11/2011 | Tremblay | H04N 5/2252 396/427 |
| 2012/0068629 A1* | 3/2012 | Matsuda | H05B 33/0803 315/313 |
| 2012/0154521 A1* | 6/2012 | Townsend | H04N 5/247 348/36 |
| 2012/0242786 A1* | 9/2012 | Sasagawa | H04N 5/247 348/36 |
| 2014/0111682 A1* | 4/2014 | Flugge | G02B 7/08 348/345 |
| 2014/0192144 A1* | 7/2014 | St. Clair | H04N 5/2251 348/36 |
| 2014/0267596 A1* | 9/2014 | Geerds | H04N 5/2252 348/38 |
| 2016/0261829 A1* | 9/2016 | Olsson | G03B 37/005 |

* cited by examiner

ELECTRONIC DEVICE WITH EFFICIENT THERMAL DISSIPATION

BACKGROUND

Electronic devices come in many different shapes and sizes. Advances in technology result in ever more powerful electronic devices (in terms of processing power, storage, and battery life). As electronic devices become more powerful, they tend to generate more heat. For example, processors, wireless transceivers, cameras, and display screens all generate heat.

If electronic devices get too hot, performance may degrade (e.g., they may become less efficient), components may become damaged, and/or surfaces may become uncomfortable to hold or operate. Thus, electronic devices are often designed to have large surface area in order to dissipate heat more effectively. In some instances, surfaces of an electronic device that are likely to contact a user may be insulated from internal heat sources to prevent the surfaces from becoming too hot to the touch.

DETAILED DESCRIPTION

Overview

As discussed above, if electronic devices get too hot, their performance may degrade, components may become damaged, and/or surfaces may become uncomfortable to hold or operate. When designing a device, one approach to reducing temperature of the device during operation is to increase a surface area of the device, thereby spreading the heat over a larger area and allowing the device to dissipate heat more effectively. However, it is not always possible to increase a surface area of the device due to one or more design constraints (e.g., size, ergonomics, cost, etc.). Another approach used to reduce temperature of a device is to insulate surfaces of the device that are likely to contact a user from internal heat sources to prevent the surfaces from becoming too hot to the touch. While insulating surfaces of the device may keep the insulated surfaces cooler to the touch, this approach reduces the overall ability of the device to dissipate heat, thus undesirably increasing temperatures within the electronic device and potentially harming and/or degrading performance of electronic components of the device.

This application describes techniques for efficiently and uniformly dissipating heat from an electronic device having a relatively small form factor having a relatively low surface area to volume ratio. In some examples, techniques described herein may be used to uniformly dissipate heat from devices having a ratio of a surface area of the electronic device to a volume of the electronic device that is at most about 0.12. In some examples, the techniques described herein include providing internal components made of metal (e.g., magnesium, aluminum, steel, etc.) or other material having relatively high thermal conductivity, to provide an efficient thermal conductive path to transfer heat from one or more heat generating sources of the electronic device uniformly to an outer housing of the electronic device. In some examples, the techniques may further include constructing the outer housing of a relatively thin sheet of material, such as plastic, having a thermal conductivity lower than that of the internal components. Using a material having a lower thermal conductivity for the outer housing limits a rate at which heat will be transferred to a user's body. Also, by using a relatively thin sheet of material, the outer housing does not substantially reduce the overall ability of the electronic device to dissipate heat to the environment. The techniques described herein may, in some instances, be performed without the need to increase the surface area of the electronic device and/or add insulation to surfaces of the electronic device.

The techniques described in this application are described in the context of a 360-degree view camera. However, the techniques are applicable to other types of electronic devices having different sizes and/or shapes. For example, and without limitation, the techniques described herein may be applied to desktop computers, laptop computers, tablet computers, mobile phones, personal digital assistants, electronic book reader devices, cameras, and the like.

Example Electronic Device

Figure 1A:
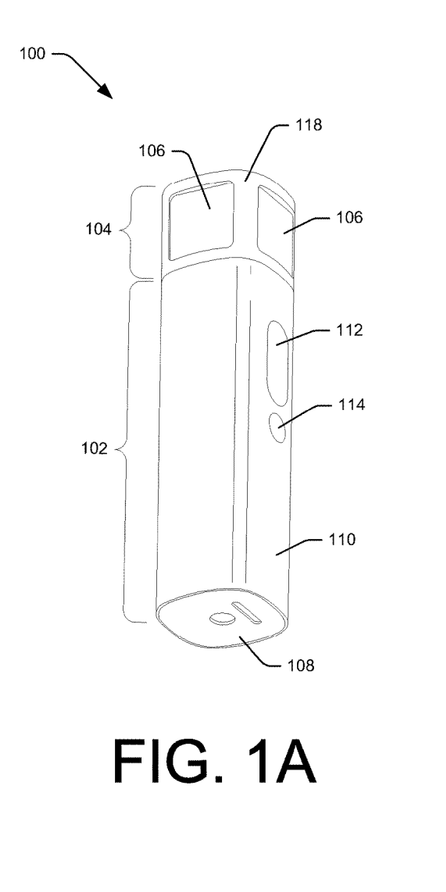
FIG. 1A illustrates a perspective view of an example electronic device having an elongated housing.

FIG. 1A is a perspective view of an example electronic device 100, which is used to illustrate the techniques described herein. The electronic device 100 in this example comprises a 360-degree view camera. However, as mentioned above, the techniques described herein are not limited to use with the electronic device 100, but are also applicable to other devices.

The electronic device 100 of this example includes an elongated tubular housing 102 having a substantially square cross section. However, in other examples, the housing may take other forms (e.g., longer or shorter lengths, different cross sectional shapes, etc.). A camera assembly 104 is disposed at one end of the housing 102. The camera assembly 102 includes multiple cameras oriented at different angles. Each camera is disposed behind a camera window 106 made of protective material (e.g., clear plastic, glass, etc.). In this example, the camera assembly 102 comprises four cameras (only two are visible in this orientation) arranged at approximately 90 degrees from one another (e.g., 0 degrees, 90 degrees, 180 degrees, and 270 degrees). Collectively the four cameras capture a 360-degree angle of view. Thus, when the electronic device 100 is placed upright, with its base 108 on a support surface, the cameras capture a 360-degree view of the surroundings of the electronic device 100.

The housing 102 of the electronic device comprises an elongated tubular housing formed by a sidewall 110. The sidewall 110 has openings for one or more buttons 112 and 114 or other controls of the electronic device 100. During use, a user will typically hold the electronic device 100 by the housing 102 while operating the buttons 112 and 114, and then place the electronic device upright with its base 108 resting on a support surface such as a table, shelf, or the floor.

Figure 1B:
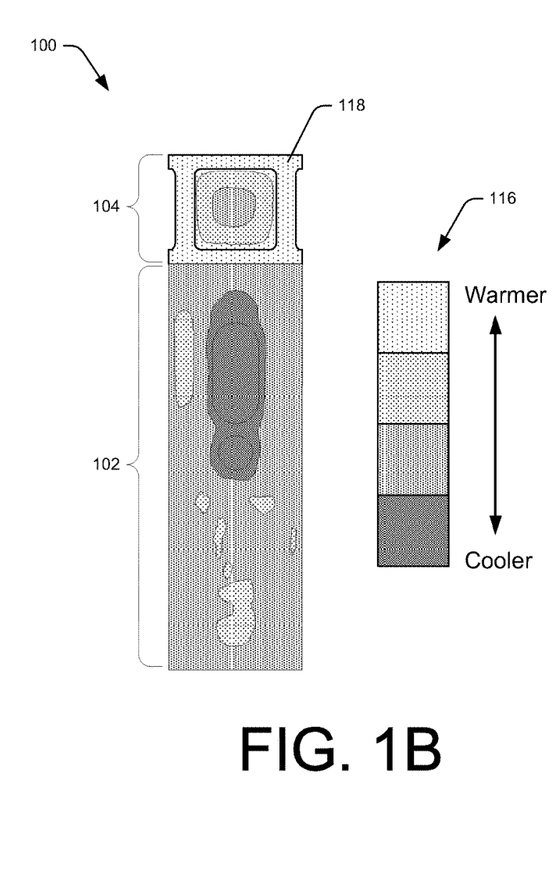
FIG. 1B illustrates an example thermal model of the example electronic device shown in FIG. 1A.

FIG. 1B is a schematic front view of the electronic device 100 showing a thermal map or model of the device. During use, one or more electronic components (e.g., processors, memory, camera sensors, circuits, radios, batteries, power sources, etc.) of the electronic device 100 generate heat. FIG. 1B illustrates surface temperatures of various portions of the electronic device due to heat generated by the electronic components within the electronic device 100. Temperatures are shown by stippling according to the key 116, with cooler temperatures shown in darker (denser) stippling and hotter warmer temperatures shown in lighter (less dense) stippling. As shown, the frame 118 of the camera assembly 104 is the warmest portion of the electronic device 100. The portion of the device that is most likely to be handled by the user, the housing 102, tends to be cooler, with the area around the buttons 112 and 114 being the coolest. However, all of the temperatures shown in FIG. 1B are within a range that is comfortable for a user to hold. Also, while FIG. 1B illustrates a range of temperatures, the range is relatively small and there is very little temperature variation over the surface of the device, particularly over the surface of the housing 102. In some examples, the temperatures measured at the surface of the device during use may range from about 42 degrees Celsius to about 50 degrees Celsius at a 4200 milliwatt consumption rate, or from about 44 degrees Celsius to about 52 degrees Celsius at 4800 milliwatts. The range of temperature variation over just the housing 102 is even smaller (e.g., about 42 degrees Celsius to about 46 degrees Celsius at 4200 milliwatts, or from about 44 degrees Celsius to about 50 degrees Celsius at 4800 milliwatts). This small range of temperature variation over the surface of the device is indicative of the uniformity with which heat from electrical components of the electronic device 100 is transmitted through the internal components to the surfaces of the housing 102 and the camera assembly 104.

Figure 2:
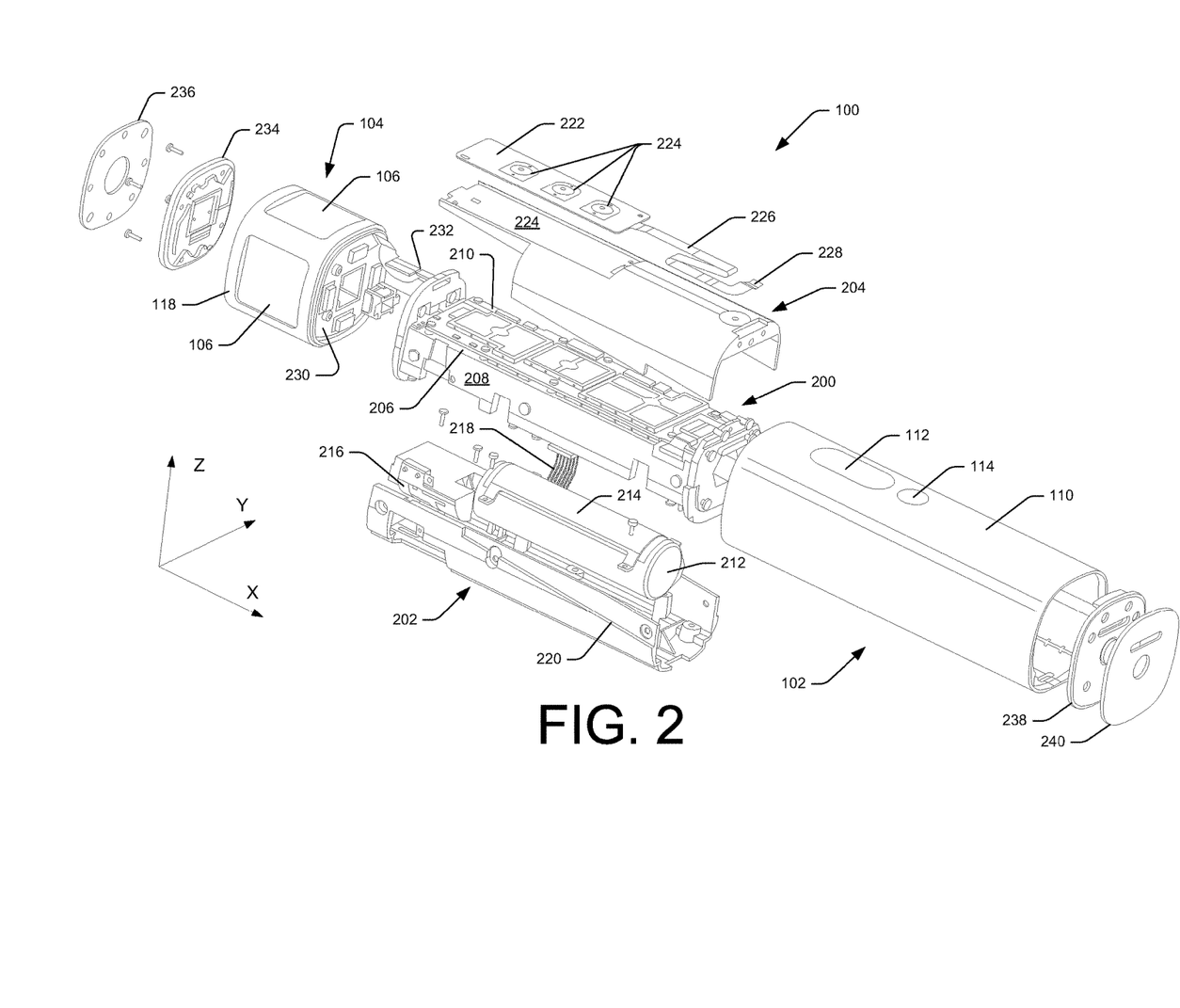
FIG. 2 is an exploded view of the example electronic device shown in FIG. 1A.

FIG. 2 is an exploded view of the example electronic device 100. As shown in FIG. 2, the electronic device includes the elongated tubular housing 102 and the camera assembly 104. The housing 102 is elongated in the longitudinal (X) direction in FIG. 2. The housing 102 is sized to receive a chassis 200 (sometimes referred to as the "main chassis") encircled by a pair of clamshells or channels, namely a first channel 202 and a second channel 204. The housing 102 comprises a tube bounded by the sidewall 110, which defines an interior cavity. The housing 102 extends from a first end proximate the camera assembly 104 to a second end distal of the camera assembly 104. The internal cavity of the housing 102 is sized to receive the chassis 200, the first channel 202, and the second channel 204, along with various electronic components.

The chassis 200 is elongated and comprises a substantially planar rectangular base 206 and a pair of substantially planar walls 208 that project from a first side of the substantially planar rectangular base 206 in a direction substantially perpendicular to the base (downward in the negative Z direction in FIG. 2). The substantially planar rectangular base 206 and the pair of walls 208 together define a generally C-shaped cross section of the chassis 200. One or more electronic components are coupled to the chassis 200 on a second side of the base, opposite the first side of the base from which the pair of substantially planar walls projects. At least some of the electronic components generate heat when in use. Such electronic components are referred to herein as "heat generating sources." In the illustrated example, a printed circuit board (PCB) 210 is coupled to the chassis 200 by screws, rivets, soldering, heat staking, snap fit, adhesive, and/or other attachment means. In some examples, the PCB includes a system-on-a-chip (SOC) including one or more processors communicatively coupled to memory and a radio (e.g., cellular, WiFi, Bluetooth, etc.) for wireless transmission. The SOC may be coupled to an underside of the PCB, so as to be directly adjacent to the substantially planar rectangular base 206 of the chassis 200 to promote efficient heat transfer. The PCB may additionally or alternatively include a power management integrated circuit (PMIC), an amplifier (e.g., audio amplifier), a light source (e.g., light emitting diode, bulb, etc.), battery or other electronic components. In other examples, electronic devices may include different electronic components laid out in different ways.

The first channel 202 has a generally C-shaped cross section and is interposed between a first side of the chassis 200 and the tubular housing 102. Various electronic components may also be coupled to the first channel 202. In the illustrated example, a battery 212 is disposed in a cavity defined by the C-shaped cross section of the first channel 202 and is held in place by a battery clamp 214. In this example, the battery 212 is spaced a distance from the elongated main chassis 200 such that the battery 212 is thermally decoupled from the PCB 210 coupled to the elongated chassis 200. An antenna 216 is coupled to the first channel 202 and is positioned in an opening in a wall of the first channel 202 such that, when assembled, the antenna 216 is directly adjacent the sidewall 110 of the tubular housing 102. The battery 212 and antenna 216 are electrically and communicatively coupled to the electronic components on chassis 200 by a buss, flex circuit, and/or other electrical connection 218. The first channel 202 includes ramps 220 disposed on the lateral sidewalls of the first channel 202. The ramps 220 taper from the first end of the tubular housing (nearest the camera assembly 104) to the second end of the tubular housing 102 (distal the camera assembly). That is, when viewed from a lateral side (i.e., the Y direction in FIG. 2), the ramps 220 define a wedge shape with a wider portion of the wedge nearest the camera assembly 104.

The second channel 204 also has a generally C-shaped cross section. The second channel 204 is interposed between a second side of the chassis 200, opposite the first side, and the tubular housing 102. The second channel 204 is tapered from the second end of the tubular housing (distal the camera assembly 104) to the first end of the tubular housing 102 (nearest the camera assembly 104). That is, when viewed from a lateral side (i.e., the Y direction in FIG. 2), the second channel 204 defines a wedge shape with a narrower portion of the wedge nearest the camera assembly 104. Accordingly, the taper of the second channel 204 is complimentary to the taper of the ramps 208 of the first channel 202. A flexible printed circuit board (FPCB) 222 is disposed in a recess or slot 224 formed in an exterior surface of the second channel 204. The FPCB 222 may include one or more actuatable circuit elements 224 that, when assembled, align with the buttons 112 and 114 or other controls disposed in the openings in the sidewall 110 of the tubular housing 102. The FPCB 222 includes an elongated flexible trace 226 terminating in a plug 228 that, when assembled, plugs into a receptacle on the PCB 210 to electrically and communicatively couple the FPCB 222 to the electronic components of the chassis 202.

As used herein, term "C-shaped" or "generally C-shaped" includes geometries having relatively sharp corners (as in the case of the cross section of the main chassis) as well as those having rounded corners (as in the case of the cross sections of the first channel and the second channel).

The camera assembly 104 is attached to the first end of the chassis 200. Specifically, a camera chassis 230 (shown and described more fully with reference to FIG. 3) is attached to a plate disposed at the first end of the chassis 200 by screws, rivets, soldering, heat staking, snap fit, adhesive, and/or other attachment means. Electronic components of the camera assembly 104 are electrically and communicatively coupled to electronics on the chassis 200 by a buss, flex circuit, and/or other electrical connection 232. A top cap 234 is secured to a top of the camera assembly 104.

A top cover 236 is coupled to a top of the top cap 234. The top cover 236 includes an opening size to receive a button (e.g., power button) or other control disposed on the top of the top cap 234. After the tubular housing 102 is slid into place over the chassis 200, first channel 202, and second channel 204, a bottom cap 238 is attached to a plate at the second end of the chassis 200 (i.e., distal to the camera assembly 104). A bottom pad 240 is adhered or otherwise coupled to a bottom of the bottom cap 238. During use, the electronic device 100 may be set with the bottom pad 240 resting on a support surface.

In some examples, the chassis 200, the first channel 202, the second channel 204, the top cap 234, and the bottom cap 238 may be made of a material having a relatively high thermal conductivity, such as magnesium, aluminum, steel, or other metals. In some examples, the chassis 200, the first channel 202, the second channel 204, the top cap 234, and the bottom cap 238 may all be made of a same material, while in other examples one or more of such components may be made of different materials. The tubular housing 102, top cover 236, buttons 112 and 114, the top button (not shown), and the bottom pad 240 may be made of plastic, rubber, or other material having a thermal conductivity lower than that of the metal of the chassis 200, the first channel 202, the second channel 204, the top cap 234, and the bottom cap 238. In one specific example, the tubular housing 102, top cover 236, the buttons 112 and 114, and the top button (not shown) are made of plastic, while the bottom pad 240 is made of silicone, rubber, or other soft elastomeric material.

Figure 3:
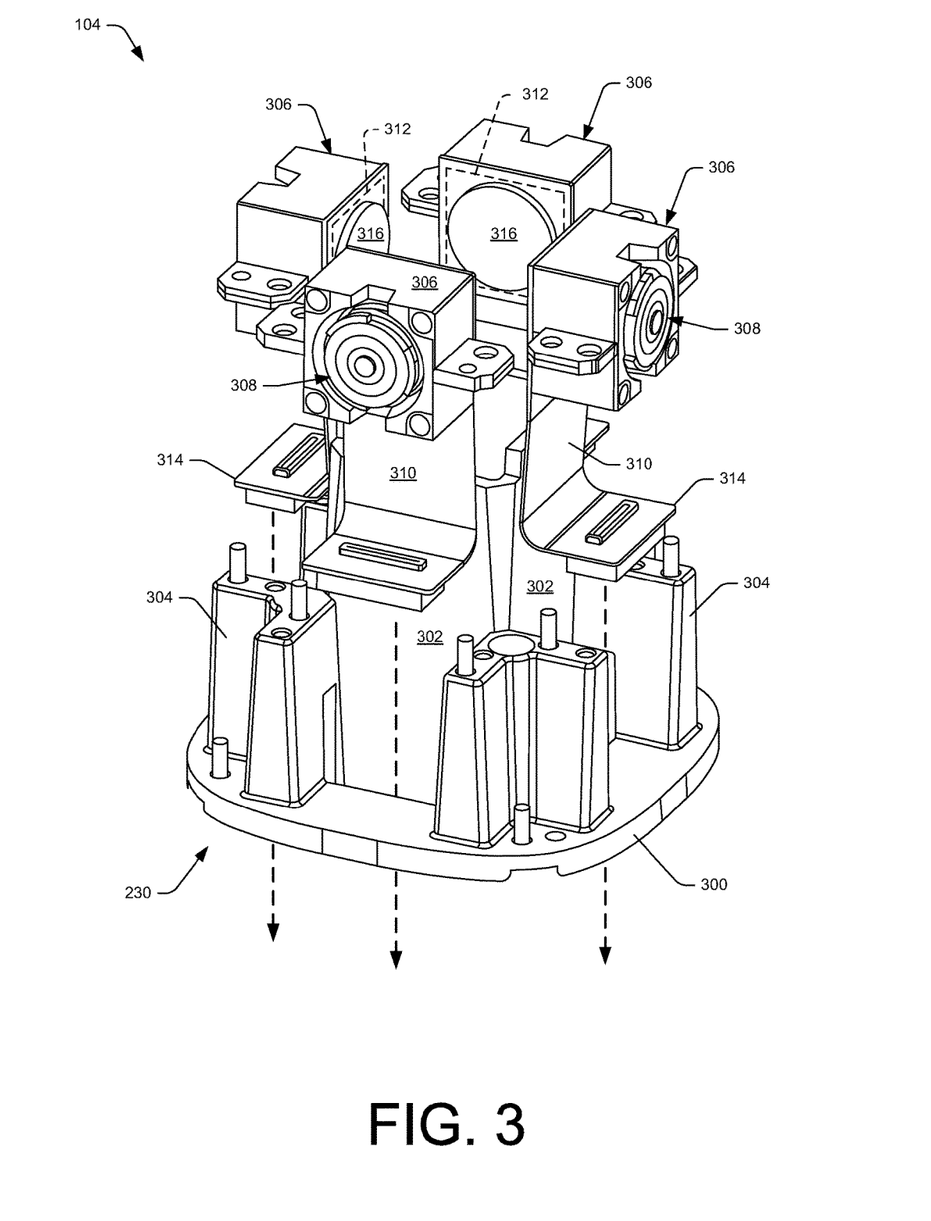
FIG. 3 is an exploded view of a camera assembly of the electronic device of FIG. 1A.

FIG. 3 is an exploded view of the camera assembly 104 with the camera frame 118 and the camera windows 106 omitted for clarity. The camera assembly 104 includes the camera chassis 230, by which the camera assembly 104 couples to the main chassis 200. The camera chassis 230 in this example includes a base plate 300, a four-sided central column 302 projecting up from a center of the base plate 300, and four corner pillars 304 projecting up from the four corners of the base plate 300. Multiple camera modules 306 may be coupled to the camera chassis 230 and oriented at various angles. In this example, four camera modules 306 are disposed at approximately 90 degrees relatively one another. In FIG. 2, the four camera modules 306 are shown in an exploded view, elevated above the camera chassis 230. When assembled, the camera modules 306 will be moved downward (as shown by the dashed arrows in FIG. 2) until flanges on each side of the camera modules 306 rest on and are secured to the tops of the corner pillars 304.

The four camera modules 306 each include an optical assembly 308 comprising one or more lenses, prisms, or other optical elements, coupled to a flex circuit 310. Each flex circuit 310 includes a camera sensor 312, such as a charge coupled device (CCD), active pixel sensor, or the like, and a plug 314 or other connector to couple the flex circuits 310 to the connections 232 to electrically and/or communicatively couple the camera modules 306 to the electronic components of the main chassis 200. When assembled, the camera sensors 312 are disposed adjacent to and in thermal contact with the central column 302 of the camera chassis 230, allowing the image sensors to transmit heat generated by the image sensors to the camera chassis 230 and ultimately to the main chassis 200. In some examples, a thermal paste 316 may be applied to a back side of the flex circuit 310, between the flex circuit 310 and the central column 302 of the camera chassis to further enhance the thermal contact between camera modules 306 and the camera chassis 230.

Example Assembly Techniques

Figure 4A:
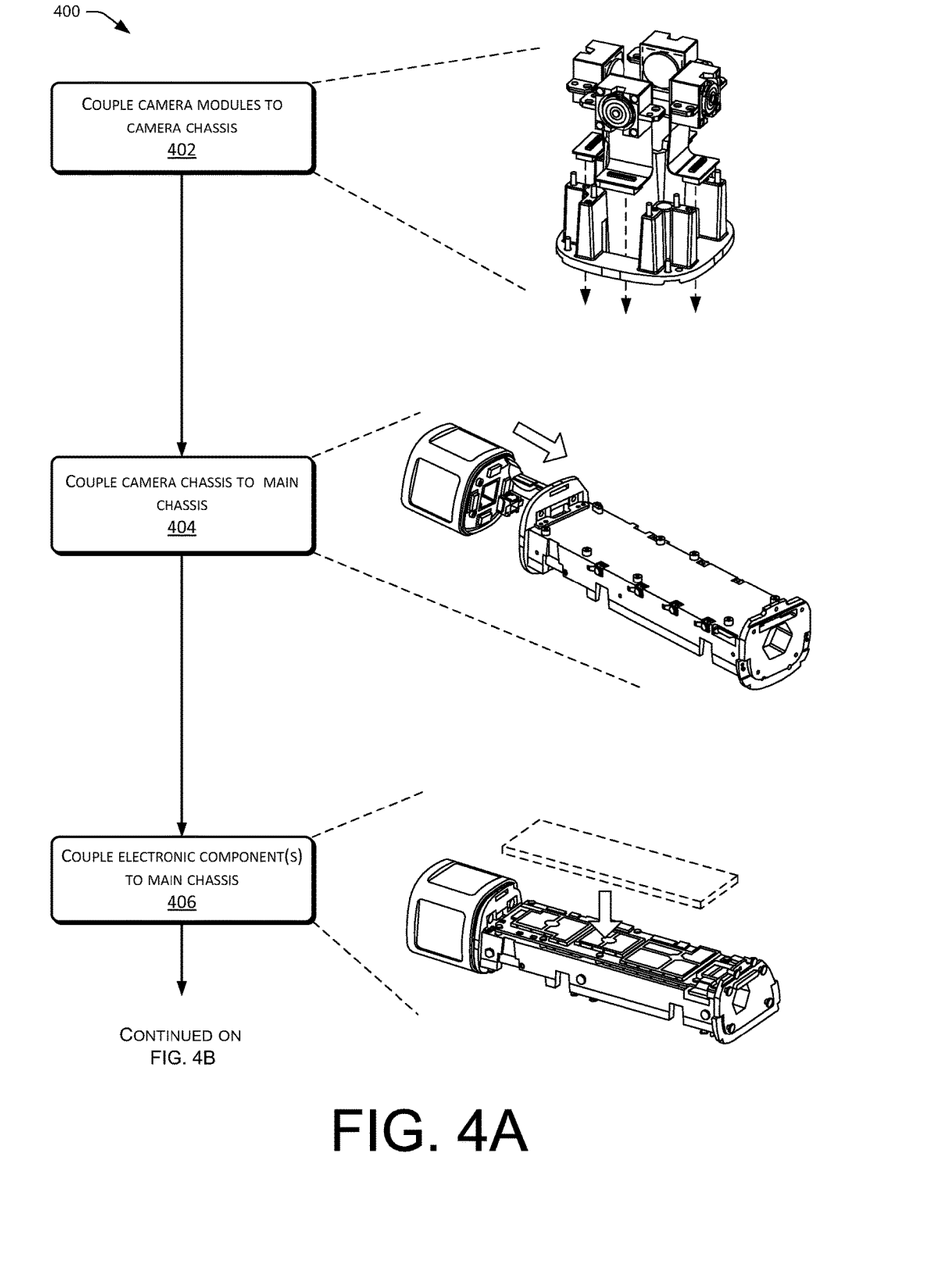
FIG. 4A is a pictorial flowchart illustrating an example method of assembling an electronic device, such as electronic device of FIG. 1A.
Figure 4B:
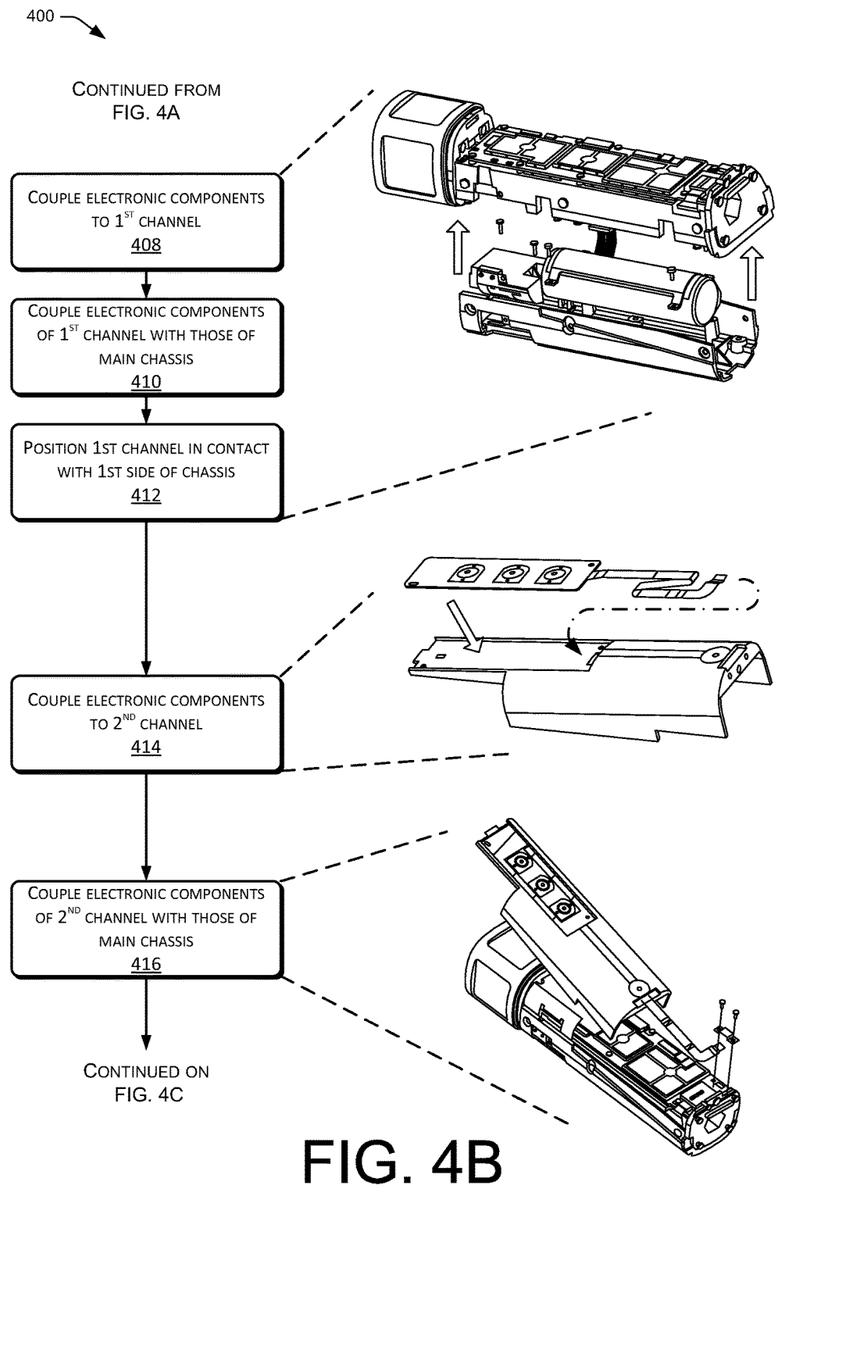
FIG. 4B is a pictorial flowchart illustrating additional operations of the example method of FIG. 4A.
Figure 4C:
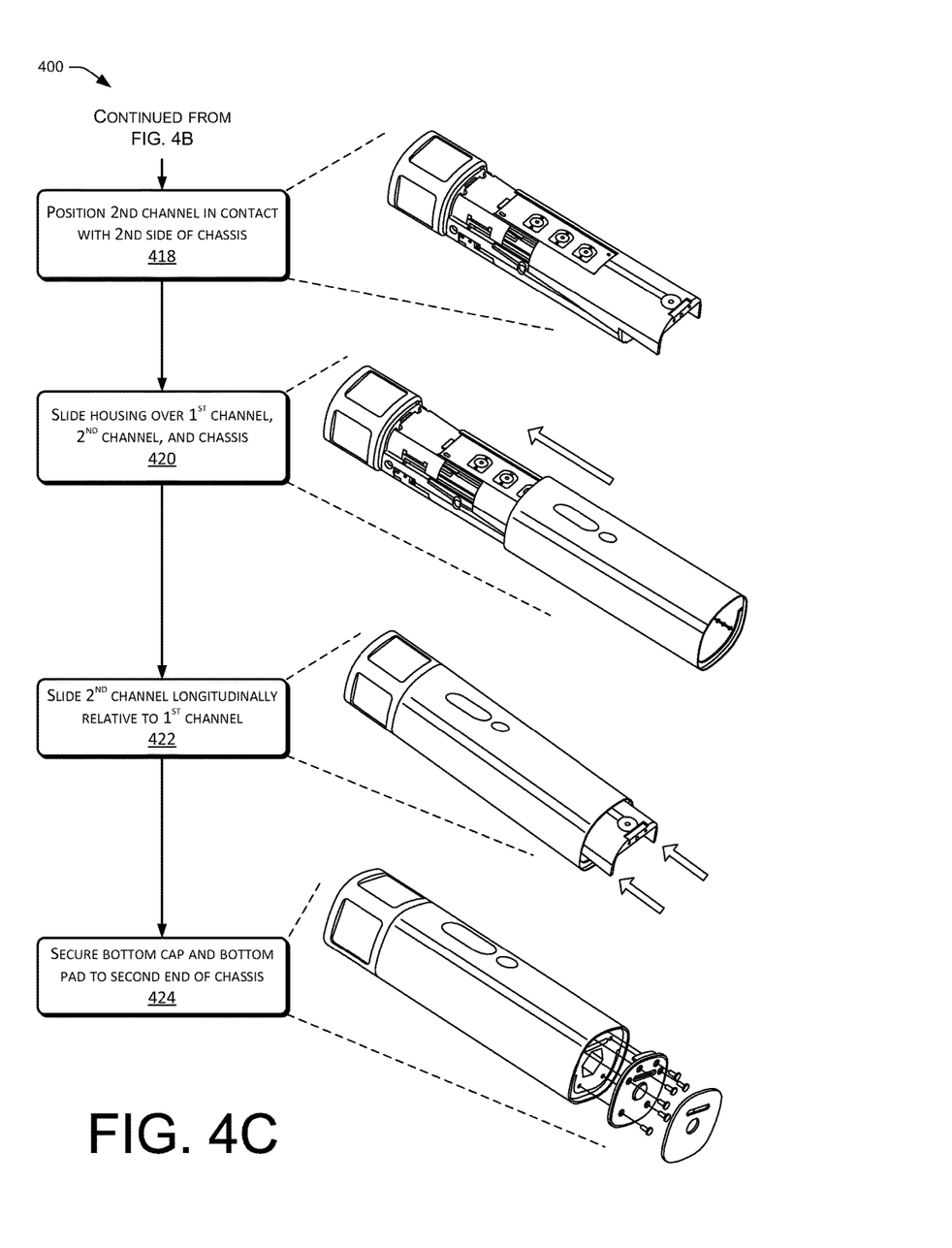
FIG. 4C is a pictorial flowchart illustrating still further operations of the example method of FIG. 4A.

FIGS. 4A-4C illustrate example techniques for assembling an electronic device. While the techniques are described in the context of assembling the electronic device 100 of FIGS. 1-3, the techniques are not limited to use in assembly of the electronic device 100 and parts or all of the techniques may be used in the assembly of other types of electronic devices.

FIG. 4A is a pictorial flowchart illustrating an example method 400 of assembling an electronic device, such as electronic device 100.

At 402, method 400 comprises assembling a camera assembly by coupling one or more camera modules to a camera chassis. The camera modules may include one or more optical components (e.g., lenses, prisms, etc.) and one or more electrical components (e.g., camera sensors, PCBs, FPCBs, traces, switches, buttons, etc.). A camera frame and one or more protective covers may be placed over the top of the camera modules and secured to the camera chassis to enclose and protect the cameras. A top cap may be coupled to a top of the camera chassis and/or the camera frame and may include one or more switches or buttons. A top cover may be coupled to a top of the top cap.

At 404, before or after having assembled the camera assembly, the camera chassis may be coupled to a main chassis of the electronic device. This may include electrically and/or communicatively coupling the camera modules and other electronic components of the camera assembly to electronic components of the main chassis via a buss, flex circuit, or other electrical connection. This may also include physically attaching the camera chassis to the main chassis using screws, rivets, soldering, heat staking, snap fit, adhesive, and/or other attachment means.

At 406, one or more electronic components may be coupled to the main chassis. The electronic components may be coupled directly or indirectly to the main chassis. One or more of the electronic components may be in contact with a surface of the main chassis to facilitate efficient conduction of thermal energy from the electronic components to the main chassis. The electronic components coupled to the main chassis may include, for example, a system-on-a-chip (SOC), a printed circuit board (PCB), a power management integrated circuit (PMIC), or any of the other electronic components described herein.

FIG. 4B is a pictorial flowchart illustrating additional operations of example method 400. The operations shown in FIG. 4B may, but need not necessarily be performed after the operations shown in FIG. 4A. At 408, one or more electronic components may be coupled to a first channel. The first channel may comprise an elongated member having a generally C-shaped cross section formed by a pair of lateral sidewalls connected by a generally planar central spine. The electronic components may be coupled directly or indirectly to the first channel. One or more of the electronic components may be in contact with a surface of the first channel to facilitate efficient conduction of thermal energy from the electronic components to the first channel. The electronic components coupled to the first channel may include, for example, a battery, an antenna, or any of the other electronic components described herein.

At 410, the electronic components of the first channel may be electrically and/or communicatively coupled to electronic components of the main chassis and/or the camera assembly by a buss, flex circuit, and/or other electrical connection. At 412, the first channel is positioned in contact with a first side of the main chassis to at least partially surround the main chassis. In the illustrated example, the first channel and the main chassis are oriented such that the open portions or "jaws" of their respective C-shaped cross sections are facing each other. The jaws of the first channel are slightly wider than those of the main chassis, such that the jaws of the first channel slide over and partially surround the main chassis on the first side. In some examples, the first channel may include ramps disposed on the jaws or lateral sidewalls of the first channel. The ramps may taper from the first end of the tubular housing (nearest the camera assembly) to the second end of the tubular housing (distal the camera assembly). Thus, when viewed from a lateral side, the ramps give the first channel a wedge shape over its length, with a wider portion of the wedge nearest the camera assembly.

At 414, before or after having performed operations 402-412, one or more electrical components may be coupled to a second channel. The second channel may comprise an elongated member having a generally C-shaped cross section formed by a pair of lateral sidewalls connected by a generally planar central spine. The electronic components may be coupled directly or indirectly to the second channel, and one or more of the electronic components may be in contact with a surface of the second channel to facilitate efficient conduction of thermal energy from the electronic components to the second channel. The electronic components coupled to the first channel may include, for example, a flex circuit, and antenna, or any of the other electronic components described herein.

At 416, the electronic components of the second channel may be electrically and/or communicatively coupled to electronic components of the main chassis and/or the camera assembly by a buss, flex circuit, and/or other electrical connection. In the illustrated example, flex circuit is coupled to the second channel. A plug of the flex circuit is secured to a receptacle of a PCB of the main chassis. The flex circuit bends during assembly to allow the second channel to slide during the assembly process harming the electrical connection.

FIG. 4C is a pictorial flowchart illustrating additional operations of example method 400. The operations shown in FIG. 4C may, but need not necessarily be performed after the operations shown in FIGS. 4A and 4C.

At 418, the second elongated channel is positioned in contact with a second side of the chassis (opposite the first side of the chassis) to at least partially surround the chassis. The jaws of the second channel are slightly wider than the main chassis, such that the jaws of the second channel slide over and partially surround the main chassis on the second side. In some examples, the second channel may be tapered from the second end of the tubular housing (furthest from the camera assembly) to the first end of the tubular housing (nearest the camera assembly). Thus, when viewed from a lateral side, the taper gives the second channel a wedge shape over its length, with a wider portion of the wedge furthest from the camera assembly. At this stage, the second channel is offset longitudinally from the first elongated channel. That is, the second channel is spaced a distance in the longitudinal direction away from the camera assembly.

At 420, a tubular housing may be slid over the first channel, the second channel, and the chassis. In the illustrated example, the tubular housing is slid from the distal end of the chassis (further from the camera assembly) toward the end of the chassis where the camera assembly is or will be installed. When completely assembled, an outer perimeter around the first channel and the second channel is substantially the same as an inner perimeter of the tubular housing. However, the tubular housing is allowed to slide over the first channel and the second channel in this partially assembled position due to the wedge shapes of the first channel and the second channel. That is, when the second channel is offset as shown at operation 418, outer perimeter around the first channel and the second channel is smaller than the inner perimeter of the tubular housing providing. The outer perimeter around the first channel and second channel is small enough in this partially assembled position to provide clearance for the tubular housing to safely slide over one or more antennas, flex circuits, button assemblies, or other features on the outer surfaces of the channels and/or the inner surface of the tubular housing. The tubular housing may be slid completely over the chassis until it abuts the camera assembly (or the plate of the chassis to which the camera assembly couples).

At 422, the second channel may be slid longitudinally relative to the first channel in the direction of the arrows. The second channel may be slid until its longitudinal ends substantially align with longitudinal ends of the first channel. This sliding motion moves the second channel longitudinally toward the camera assembly (or the plate of the chassis to which the camera assembly couples) and into the tubular housing. This sliding motion also causes the first channel and the second channel to move laterally away from each other as the tapered edge of the second channel rides against the tapered ramps of the first channel. Thus, as the second channel is pressed into the tubular housing in this operation, the first channel and the second channel are also pressed outward toward the sidewall of the tubular housing. In this way, the first channel and the second channel may provide structural support for the tubular housing. Additionally or alternatively, in some examples, one or more antennas, flex circuits, or other features of the first channel and the second channel may be moved laterally outward, into close proximity with the sidewall of the tubular housing, which may help improve performance of such features.

At 424, a bottom cap may be secured to an end of the chassis distal to the camera assembly, and a bottom pad may be applied over the bottom cap. The bottom cap holds the second channel in place in the tubular housing. The bottom pad provides a soft, non-slip surface on which the electronic device can be set.

Figure 5A:
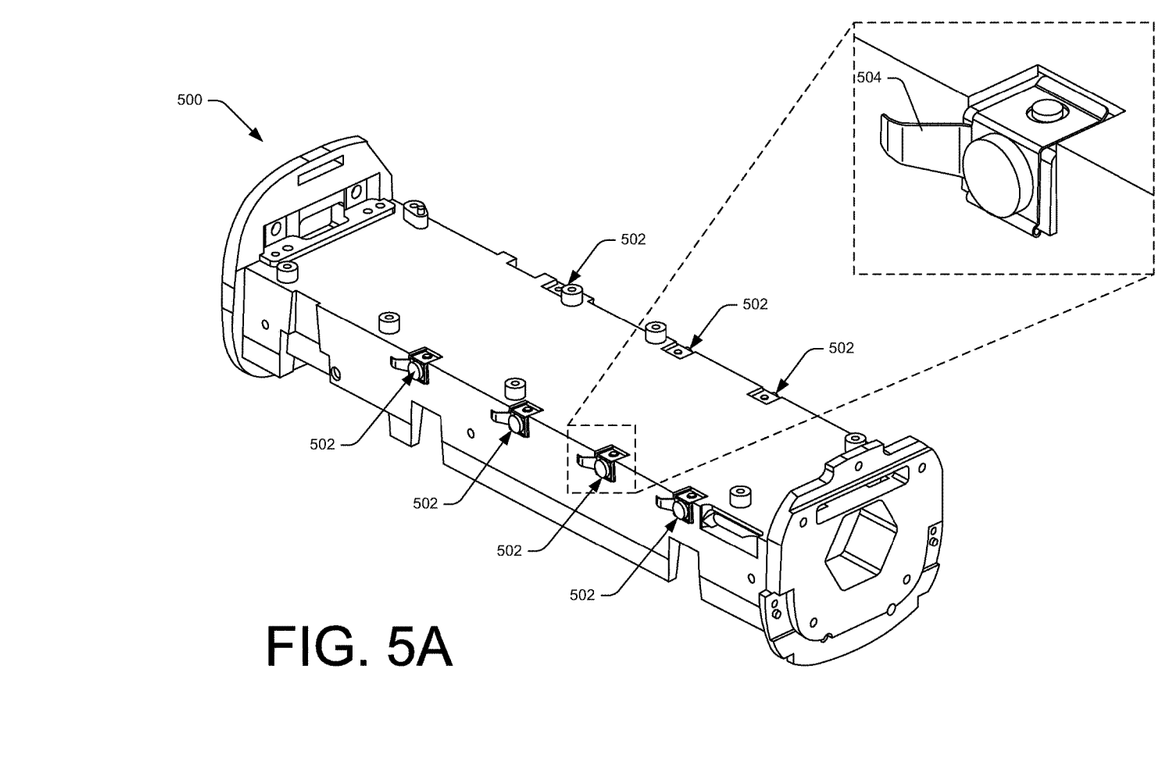
FIG. 5A is a perspective view of an example chassis having grounding clips.
Figure 5B:
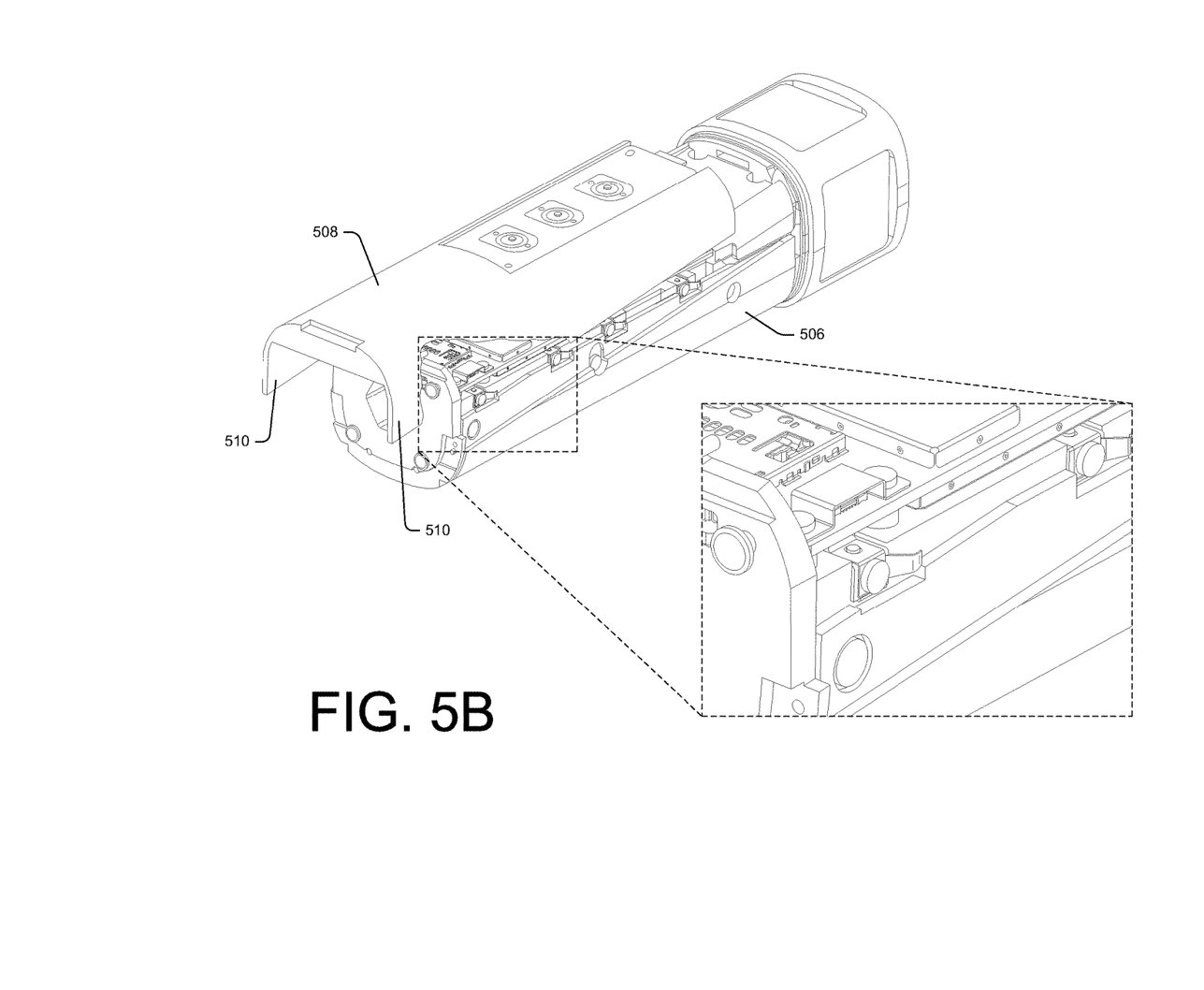
FIG. 5B is a perspective view of an example electronic device using the chassis of FIG. 5A.

FIGS. 5A and 5B illustrate additional techniques for achieving robust electrical grounding when coupling a sliding channel to a stationary chassis.

FIG. 5A illustrates an example chassis 500. The chassis 500 is similar in most respects to the chassis shown in FIG. 2. Thus, only the differences will be described here. The chassis 500 includes multiple grounding clips 502 disposed along one or both lateral edges of the chassis 500. The grounding clips 502 are fixed to the chassis 500 by screws, rivets, soldering, heat staking, snap fit, adhesive, and/or other attachment means. Each of the grounding clips 502 includes a small leaf spring 504 (shown in the enlarged detail view) that biases outward to touch off an inner surface of a channel that slides over the chassis 500.

FIG. 5B is a partial cut away view of an electronic device including the chassis 500 of FIG. 5A. As shown, a first channel 506 is coupled to a first (bottom) side of the chassis 500, and a second channel 508 is being placed into a second (top) side of the chassis 500. The second channel 508 includes lateral sidewalls 510. When the second channel 508 is lowered into place, the springs 504 of the grounding clips 502 will come into contact with and ride against interior surfaces of the lateral sidewalls 508 of the second channel 508. Thus, the springs 504 provide multiple points of contact and help to ensure a good electrical ground between the second channel 508 and the chassis 500.

Figure 6:
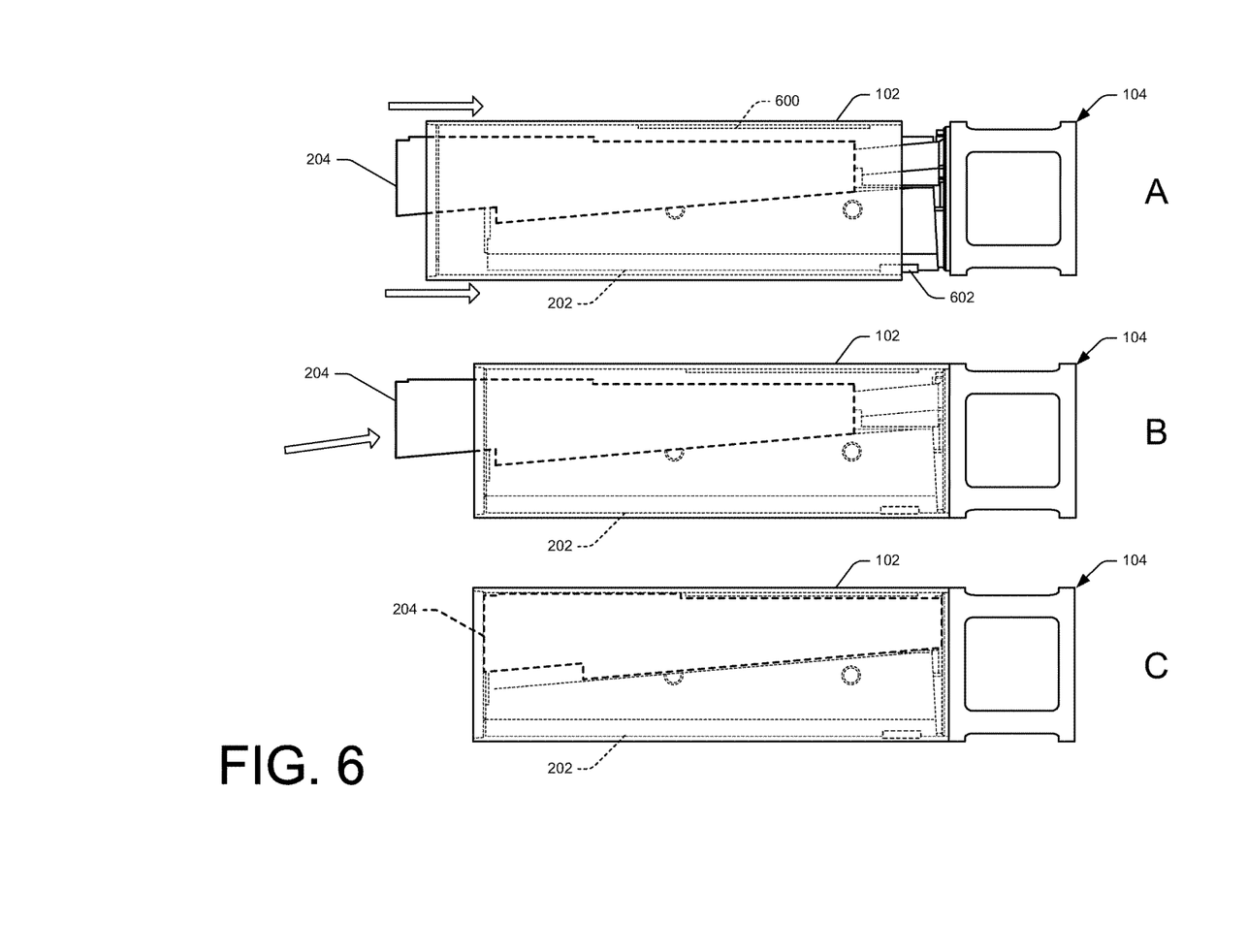
FIG. 6 is a schematic view which shows three sequential side views of the electronic device of FIG. 1A corresponding to operations of the method illustrated in FIG. 4C.

FIG. 6 is a schematic view which shows three sequential side views of the electronic device 100 corresponding to operations 420 and 422 of FIG. 4C. In these side views, components of the first channel 202 and the second channel 204 that are within the tubular housing 102 are shown in phantom lines.

A first side view, designated A in FIG. 6, corresponds to the beginning of operation 420. At this stage, the second channel 204 is offset longitudinally from the first channel 202 (i.e., is spaced apart from the camera assembly 104) and the tubular housing 102 is slid part way onto the chassis. Arrows designate the direction of motion of the tubular housing 102. In this position, the first channel 202 and the second channel 204 are close enough together to provide clearance for the tubular housing 102 to slide longitudinally over an exterior of the first channel 202 and the second channel 204 without interference. As shown in view A, the clearance between the exterior of the first channel 202 and the second channel 204 and the interior of the tubular housing 102 is sufficient to allow a button assembly 600 disposed on an interior of the tubular housing 102 to slide over the second channel 204. The clearance between the exterior of the first channel 202 and the second channel 204 and the interior of the tubular housing 102 is sufficient to allow the tubular housing 102 to slide past an antenna 602 that protrudes slightly from the first channel 202.

A second side view, designated B in FIG. 6, corresponds to the end of operation 420. At this stage, the first channel 202 and the second channel 204 are in the same positions as in view A, but the tubular housing 102 is slid completely onto the chassis. In this position, the tubular housing abuts the camera assembly 104. Pressing in the direction of the arrow in view B causes the second channel 204 to translate longitudinally into the tubular housing 102 (toward the camera assembly 104) and also laterally outward (away from the first channel 202). In this way, an outer perimeter of the first channel 402 and the second channel 404 is caused to expand, pressing the first channel 202 and the second channel 204 into close proximity and/or contact with an inner surface of the tubular housing 102. The third side view, designated C in FIG. 6, illustrates the location of the second channel 204 once it has been slid completely into the tubular housing 102. In this position, the antenna 602 is pressed substantially adjacent to the inner surface of the sidewall of the tubular housing, and the flex circuit 222 carried in the recess 224 in the second channel 204 is aligned with and brought into close proximity and/or contact with the button assembly 600.

Example Thermal Transmission Path

As discussed above, the chassis 200, the first channel 202, the second channel 204, the camera chassis 230, the top cap 234, and the bottom cap 238 may be made of metal or other material(s) with high thermal conductivity. Accordingly, when assembled, the chassis 200, the first channel 202, the second channel 204, the camera chassis 230, the top cap 234, and the bottom cap 238 collectively provide a conductive path to effectively conduct heat away from the heat generating sources to the sidewall 110 of the tubular housing 102, the top cover 236, and the bottom pad 240 for dissipation to an exterior of the electronic device 100. Thus, heat from the heat generating sources is transferred uniformly outward toward an exterior of the electronic device 100. As also noted above, in some examples, the tubular housing 102, the top cover 236, and/or the bottom pad 240 may be made of plastic, silicone, rubber, or other materials having a lower thermal conductivity in order limit a rate at which thermal energy will be transmitted to a hand of a user.

Figure 7:
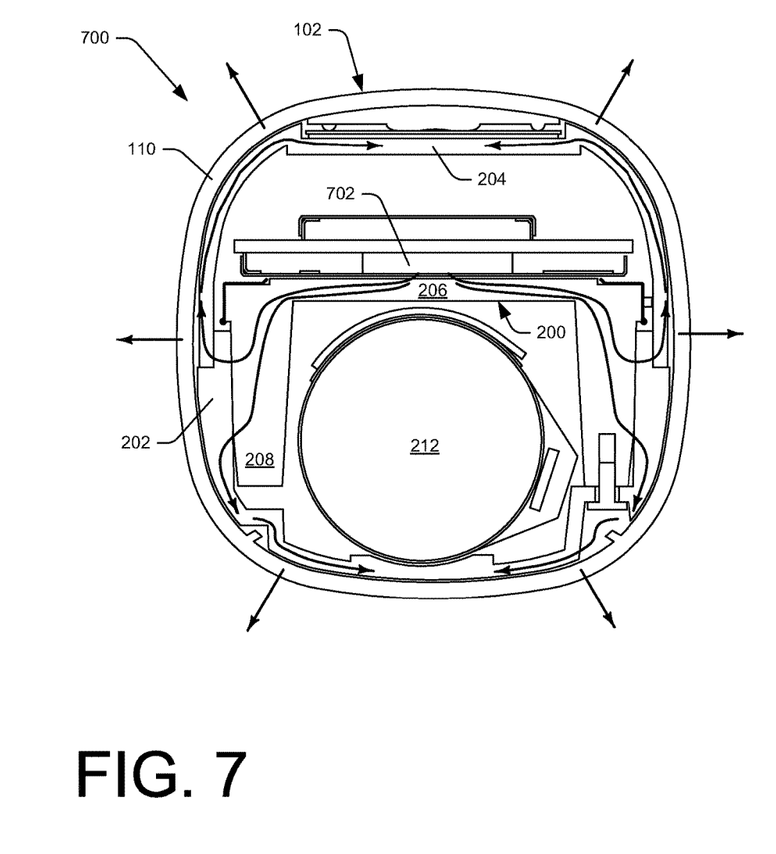
FIG. 7 illustrates a thermal transmission path from one example heat generating source to an exterior of the electronic device of FIG. 1A.

FIG. 7 illustrates a thermal transmission path from one example heat generating source to an exterior of the electronic device 100. FIG. 7 includes a cross sectional view 700 of the electronic device 100 taken along line A-A. In this example, the heat generating source comprises a SOC 702 disposed directly adjacent to the chassis 200. In some examples, a thermal paste may be disposed between the SOC 702 and the chassis 200 to further enhance the thermal interface between the two. As shown by the arrows in FIG. 7, heat generated by the SOC, is conducted to the chassis 200. The heat flows laterally outward through the substantially planar rectangular base 206 of the chassis 200 and into the pair of substantially planar walls 208 of the chassis 200, where it is conducted to the first channel 202 and the second channel 204. The heat flows throughout the cross sections of the first channel 202 and the second channel 204. The heat conducts at a relatively high rate through the chassis 200, first channel 202, and second channel 204 due to the high thermal conductivity materials from which they are made. The heat then conducts, at a slower rate, through the sidewall 110 of the tubular housing 102, which is made of a material with a lower thermal conductivity, before it radiates out to the environment. The uniformity and efficiency with which heat is dissipated from the electronic device 100 is due at least in part to the close proximity, and limited air gaps, between an outer surface of the first channel 202 and an inner surface of the sidewall 110 of the tubular housing 102, and between an outer surface of the second channel 204 and the inner surface of the sidewall 110 of the tubular housing 102.

Conclusion

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A portable electronic device comprising:
an elongated tubular housing having a first end, a second end opposite the first end, and a sidewall extending from the first end to the second end and defining an interior cavity;
an elongated chassis disposed within the interior cavity of the elongated tubular housing;
a camera assembly disposed at the first end of the elongated tubular housing, the camera assembly comprising:
a camera chassis coupled to the elongated chassis; and
multiple camera modules coupled to the camera chassis, each camera module comprising a camera sensor in thermal contact with the camera chassis;
an integrated circuit communicatively coupled to the multiple camera modules, and thermally coupled to the elongated chassis and spaced a distance from the sidewall of the elongated tubular housing;
a first elongated channel at least partially encircling the elongated chassis and interposed between a first side of the elongated chassis and the elongated tubular housing, the first elongated channel having a generally C-shaped cross section, the first elongated channel including a portion which is tapered in a direction from the first end of the elongated tubular housing toward the second end of the elongated tubular housing; and
a second elongated channel at least partially encircling the elongated chassis and interposed between a second side of the elongated chassis opposite the first side and the elongated tubular housing, the second elongated channel having a generally C-shaped cross section, the second elongated channel including a portion which is tapered in a direction from the second end of the elongated tubular housing toward the first end of the elongated tubular housing,
the elongated chassis being in thermal contact with the integrated circuit, the first elongated channel, and the second elongated channel to transmit heat away from the integrated circuit to the first elongated channel and the second elongated channel,
the camera chassis being in thermal contact with the elongated chassis to transmit heat away from the camera sensors to the elongated chassis, and
the first elongated channel and the second elongated channel being in thermal contact with the elongated chassis to transmit heat from the elongated chassis toward the sidewall of the elongated tubular housing for dissipation to an exterior of the portable electronic device.

2. The portable electronic device of claim 1, further comprising a battery coupled to the first elongated channel, the battery being disposed between the elongated chassis and the first elongated channel and spaced a distance from the elongated chassis such that the battery is thermally decoupled from the integrated circuit coupled to the elongated chassis.

3. The portable electronic device of claim 1, wherein:
the elongated chassis, the first elongated channel, and the second elongated channel comprise metal; and
the elongated tubular housing comprises plastic having a thermal conductivity lower than that of the metal of the elongated chassis, the first elongated channel, and the second elongated channel.

4. An electronic device comprising:
a tubular housing having a first end, a second end opposite the first end, and a sidewall extending from the first end to the second end and defining an interior cavity;
a chassis disposed within the interior cavity of the tubular housing;
a heat generating source coupled to the chassis and spaced a distance from the tubular housing;
a first channel interposed between a first side of the chassis and the tubular housing, the first channel having a generally C-shaped cross section, the first elongated channel including a portion which is tapered in a direction from the first end of the tubular housing toward the second end of the tubular housing; and
a second channel interposed between a second side of the chassis opposite the first side and the tubular housing, the second channel having a generally C-shaped cross section, the second elongated channel including a portion which is tapered in a direction from the second end of the tubular housing toward the first end of the tubular housing,
the chassis, the first channel, and the second channel, providing a conductive path to conduct heat away from the heat generating source to the sidewall of the tubular housing for dissipation to an exterior of the electronic device.

5. The electronic device of claim 4, wherein the heat generating source comprises at least one of:
a system-on-a-chip;
a processor;
memory;
a camera module;
a radio;
a power management integrated circuit;
an amplifier; or
a light source.

6. The electronic device of claim 4, further comprising a battery coupled to the first channel, the battery being disposed between the chassis and the first channel and spaced a distance from the chassis such that the battery is thermally decoupled from the heat generating source coupled to the chassis.

7. The electronic device of claim 4, wherein:
the chassis, the first channel, and the second channel comprise metal; and
the tubular housing comprises plastic having a thermal conductivity lower than that of the metal of the chassis, the first channel, and the second channel.

8. The electronic device of claim 4, further comprising a camera assembly disposed at the first end of the tubular housing, the camera assembly comprising:
a camera chassis coupled to the chassis; and
multiple camera modules coupled to the camera chassis, each camera module comprising a camera sensor in thermal conductivity with the camera chassis,
the camera chassis being in thermal contact with the chassis to transmit heat generated by the camera sensors to the chassis.

9. The electronic device of claim 4, wherein at least a portion of an outer surface of the first channel is adjacent to an inner surface of the sidewall of the tubular housing, and at least a portion of an outer surface of the second channel is adjacent to the inner surface of the sidewall of the tubular housing.

10. The electronic device of claim 4, wherein a ratio of a surface area of the electronic device to a volume of the electronic device is about 0.12 mm²/mm³.

11. The electronic device of claim 4, wherein:
an outer surface of at least one of the first channel or the second channel comprises a recess; and
the sidewall of the tubular housing comprises an opening aligned with the recess in the at least one of the first channel or the second channel, and
the electronic device further comprising:
a button disposed in the opening in the sidewall of the tubular housing; and
a flex circuit disposed in the recess in the at least one of the first channel or the second channel and aligned with the button in the opening in the sidewall of the tubular housing.

12. The electronic device of claim 4, further comprising multiple electrically conductive grounding clips disposed on an exterior of the chassis and biased outwardly to contact with an interior surface of at least one of the first channel or the second channel.

13. The electronic device of claim 4, further comprising an antenna coupled to an outer surface of one of the first channel or the second channel and located substantially adjacent to an inner surface of the sidewall of the tubular housing.

14. The electronic device of claim 4, wherein:
the chassis comprises:
a substantially planar rectangular base; and
a pair of substantially planar walls projecting from a first side of the base in a direction substantially perpendicular to the base; and
the heat generating source is coupled to a second side of the base opposite the first side from which the pair of substantially planar walls projects.

15. A method of assembling an electronic device, the method comprising:
coupling a one or more electronic components to an elongated chassis;
positioning a first elongated channel in thermal contact with a first side of the elongated chassis to at least partially surround the elongated chassis, the first elongated channel being wedge-shaped over its length;
positioning a second elongated channel in thermal contact with a second side of the elongated chassis opposite the first side to at least partially surround the elongated chassis, the second elongated channel being wedge-shaped over its length and being offset longitudinally from the first elongated channel;
sliding a tubular housing over the first elongated channel, the second elongated channel, and the elongated chassis; and
sliding the second elongated channel longitudinally and laterally relative to the first elongated channel to substantially align longitudinal ends of the second elongated channel with longitudinal ends of the first elongated channel and to cause the second elongated channel to abut an interior surface of the tubular housing.

16. The method of claim 15, wherein the sliding the second elongated channel longitudinally relative to the first elongated channel includes sliding at least one of an antenna or a flex circuit longitudinally into the tubular housing and laterally toward the interior surface of the tubular housing.

17. The method of claim 15, further comprising:
securing multiple camera modules to a camera chassis; and
coupling the camera chassis to the elongated chassis.

18. The method of claim 17, wherein:
the elongated chassis, the first elongated channel, the second elongated channel, and the camera chassis comprise metal;
positioning the first elongated channel in contact with the first side of the elongated chassis creates a thermally conductive path from the elongated chassis to the first elongated channel;
positioning the second elongated channel in contact with the second side of the elongated chassis creates a thermally conductive path from the elongated chassis to the second elongated channel; and
coupling the camera chassis to the elongated chassis creates a thermally conductive path from the camera chassis to the elongated chassis.

19. The method of claim 15, wherein the positioning the second elongated channel in contact with the second side of the elongated chassis comprises sliding the second elongated channel over multiple grounding clips protruding from the elongated chassis, such that the grounding clips bias into contact with the second elongated channel.

* * * * *